US010958553B2

(12) United States Patent
Pant et al.

(10) Patent No.: US 10,958,553 B2
(45) Date of Patent: Mar. 23, 2021

(54) NETWORK CONFIGURATION SYSTEM

(71) Applicant: Citrix Systems, Inc., Fort Lauderdale, FL (US)

(72) Inventors: Saurabh Pant, Bangalore (IN); Anup Lal Gupta, Bangalore (IN)

(73) Assignee: Citrix Systems, Inc., Fort Fauderdale, FL (US)

( * ) Notice: Subject to any disclaimer, the term of this patent is extended or adjusted under 35 U.S.C. 154(b) by 101 days.

(21) Appl. No.: 16/176,226

(22) Filed: Oct. 31, 2018

(65) Prior Publication Data

US 2020/0136949 A1  Apr. 30, 2020

(51) Int. Cl.
*H04L 12/26* (2006.01)
*G06N 3/04* (2006.01)
(Continued)

(52) U.S. Cl.
CPC ....... *H04L 43/0876* (2013.01); *G06N 3/0427* (2013.01); *G06N 3/08* (2013.01); *H04L 41/0816* (2013.01); *H04L 43/06* (2013.01)

(58) Field of Classification Search
CPC .............. G06F 16/9535; G06F 40/30; G06F 16/24578; G06F 16/28; G06F 16/9024; G06F 16/9038; G06N 3/08; G06N 20/00; G06N 3/0454; G06N 3/084; G06N 7/005; G06N 5/043; G06N 3/0427; H04L 41/046;
(Continued)

(56) References Cited

U.S. PATENT DOCUMENTS 8,051,019 B2 *  11/2011  Sigal ........................ G06N 3/02
706/21
10,430,481 B2 *  10/2019  Tikhonov ............... G06N 20/00
(Continued)

OTHER PUBLICATIONS

Steeve Huang, "Introduction to Recommender System. Part 2 (Neural Network Approach)", TowardsDataScience.com, Feb. 16, 2018, downloaded from <https://towardsdatascience.com/introduction-to-recommender-system-part-2-adoption-of-neural-network-831972c4cbf7>.
(Continued)

*Primary Examiner* — Ninos Donabed
(74) *Attorney, Agent, or Firm* — Banner & Witcoff, Ltd.

(57) ABSTRACT

Methods and systems described herein are directed towards using artificial intelligence to recommend network features to add to networks. A network configuration system may determine the network components and usage characteristics for a network within a plurality of networks. The network configuration system may use an ensemble to generate recommendations based on the network components and usage characteristics of the plurality of networks. The ensemble may include one or more machine learning based recommenders. The ensemble may also include a non-personalized recommender that generates recommendations based on known compatibility between network features. The network configuration system may weight recommendations from each recommender to create a ranked ordering of the recommendations. The network configuration system may modify (e.g., add or remove network features) one or more networks based on the recommendations and/or user input. As networks are modified, the network configuration system may train each recommender to provide better recommendations.

13 Claims, 8 Drawing Sheets

(51) Int. Cl.
*G06N 3/08* (2006.01)
*H04L 12/24* (2006.01)

(58) Field of Classification Search
CPC ....... H04L 41/147; H04L 41/16; H04L 45/34; H04L 45/566; H04L 45/64; H04L 47/125; H04L 67/02; H04L 43/0876; H04L 41/0816; H04L 43/06
See application file for complete search history.

(56) References Cited

U.S. PATENT DOCUMENTS

| | | | |
|---|---|---|---|
| 2008/0016014 A1* | 1/2008 | Sigal | G06N 3/02 706/15 |
| 2010/0223336 A1* | 9/2010 | Fu | G06F 16/3347 709/205 |
| 2013/0007238 A1* | 1/2013 | Sandholm | G06F 16/9537 709/223 |
| 2016/0048887 A1* | 2/2016 | Joshi | G06Q 30/0271 705/14.67 |
| 2016/0098987 A1* | 4/2016 | Stolcke | G10L 17/02 704/232 |
| 2016/0359680 A1* | 12/2016 | Parandehgheibi | G06F 16/9535 |
| 2017/0103133 A1* | 4/2017 | Xiong | G06F 16/9038 |
| 2017/0161625 A1* | 6/2017 | Jannson | G06N 7/005 |
| 2018/0011937 A1* | 1/2018 | Tikhonov | G06F 16/335 |
| 2018/0014038 A1* | 1/2018 | Lamburt | G06F 16/9535 |
| 2018/0121798 A1* | 5/2018 | Barkan | G06F 16/00 |
| 2018/0240015 A1* | 8/2018 | Martin | G09B 7/00 |
| 2018/0247549 A1* | 8/2018 | Martin | G06N 3/084 |
| 2020/0090009 A1* | 3/2020 | Arora | G06K 9/00496 |

OTHER PUBLICATIONS

Steeve Huang, "Introduction to Recommender System. Part 1 (Collaborative Filtering, Singular Value Decomposition)", Hackemoon.com, Jan. 28, 2018, <https://hackemoon.com/introduction-to-recommender-system-part-1-collaborative-filtering-singular-value-decomposition-44c9659c5e75>.

Albert Au Yeung, "Matrix Factorization: A Simple Tutorial and Implementation in Python", Quuxlabs.com, Sep. 16, 2010, downloaded from <http://www.quuxlabs.com/blog/2010/09/matrix-factorization-a-simple-tutorial-and-implementation-in-python/>.

Maher Maleb, "Singular Value decomposition (SVD) in recommender systems for Non-math-statistics-programming wizards", Medium.com, Dec. 24, 2016, downloaded from <https://medium.com/@m_n_malaeb/singular-value-decomposition-svd-in-recommender-systems-for-non-math-statistics-programming-4a622de653e9>.

David Zhan Liu and Gurbir Singh, "A Recurrent Neural Network Based Recommendation System", Stanford. EDU, 9 pages.

Amar Shekhar, "Different Networking Devices and Hardware Types—Hub, Switch, Router, Modem, Bridge, Repeater", Fossbytes.com, Mar. 30, 2016, downloaded from <https://fossbytes.com/networking-devices-and-hardware-types/>.

Pronojit Saha, "Which algorithms are used in recommender systems", Quora.com, Updated Sep. 16, 2015, downloaded from <https://www.quora.com/Which-algorithms-are-used-in-recommender-systems>.

Ling Yanxiang, Guo Deke, Cai Fei, and Chen Honghui, "User-based Clustering with Top-N Recommendation on Cold-Start Problem", Computer.org, 2013 Third International Conference on Intelligent System Design and Engineering Applications, Jan. 16-18, 2013, Hong Kong, China, 5 pages.

Isaac Changhau, "Loss Functions in Neural Networks", Jun. 7, 2017, downloaded from <https://isaacchanghau.github.io/post/loss_functions/>.

Wikipedia, Collaborative filtering, downloaded Oct. 31, 2018 from <https://en.wikipedia.org/wiki/Collaborative_filtering>.

"Content-based Filtering", downloaded Oct. 31, 2018 from <http://recommender-systems.org/content-based-filtering/>.

Mihajlo Grbovic, Haibin Cheng, Qing Zhang, Lynn Yang, Phillippe Siclait, and Matt Jones, "Listing Embeddings in Search Ranking", Medium.com, Airbnb Engineering & Data Science, Mar. 13, 2018, dowloaded from <https://medium.com/airbnb-engineering/listing-embeddings-for-similar-listing-recommendations-and-real-time-personalization-in-search-601172f7603e>.

William Koehrsen, "Neural Network Embeddings Explained", TowardsDataScience.com, Oct. 1, 2018, downloaded from <https://towardsdatascience.com/neural-network-embeddings-explained-4d028e6f0526>.

Paul Covington, Jay Adams, Emre Sargin, "Deep Neural Networks for YouTube Recommendations", Static. Googleusercontent.com, downloaded from <http://static.googleusercontent.com/media/research.google.com/en//pubs/archive/45530.pdf>.

\* cited by examiner

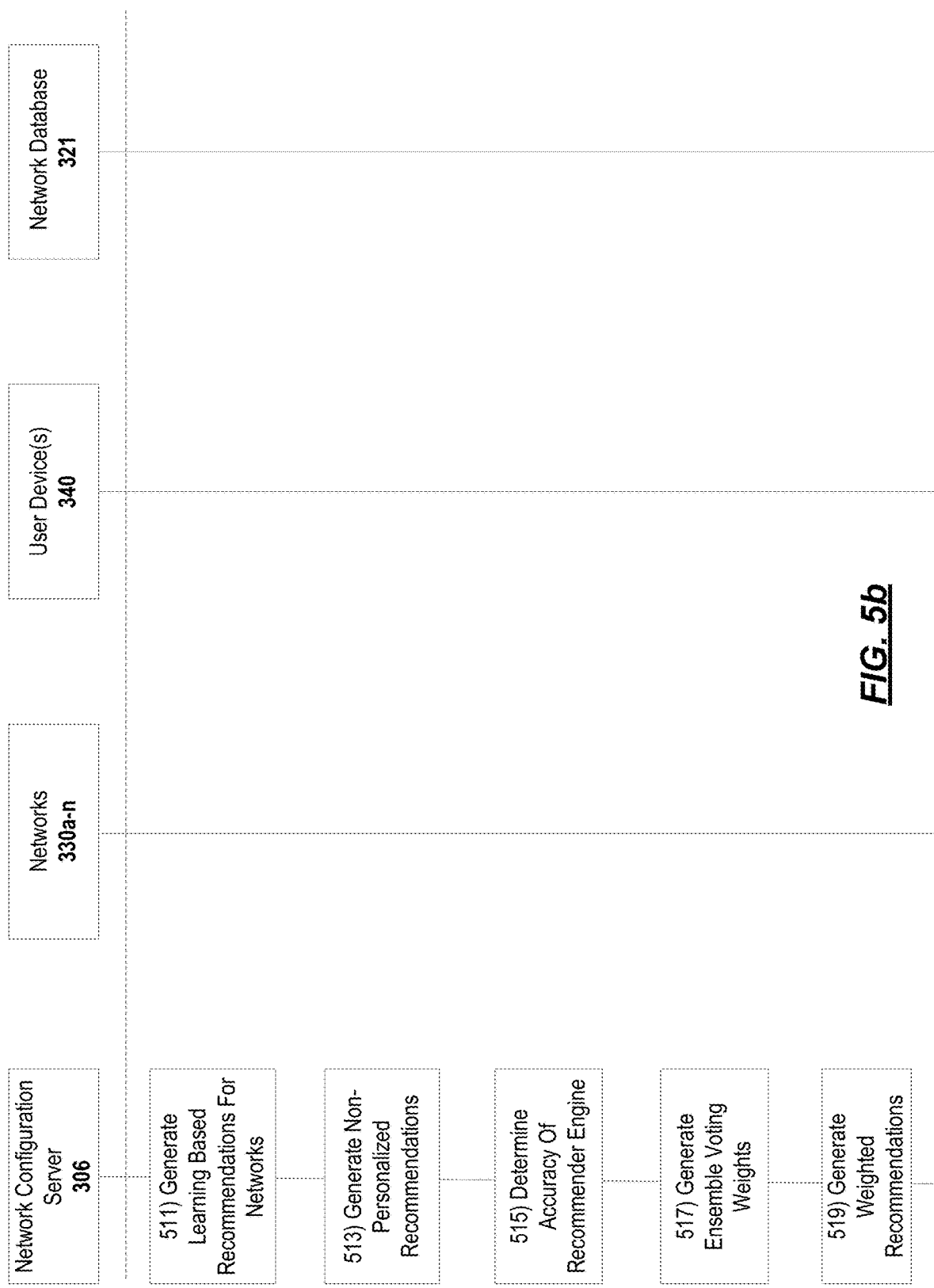

|  | Reporting | Firewall | User Behavior Analytics | Deep Packet Inspection | Application Steering |
|---|---|---|---|---|---|
| Application Steering | 0.3 | 0 | 0 | 0.9 | 0 |
| Deep Packet Insepction | 0.9 | 0.8 | 0.7 | 0 | 0.9 |
| User Behavior Analytics | 0.8 | 0.7 | 0 | 1 | 0 |
| Firewall | 0.7 | 0 | 0.7 | 0.8 | 0 |
| Reporting | 0 | 0.7 | 0.8 | 0.9 | 0.3 |

*FIG. 6*

NETWORK CONFIGURATION SYSTEM

FIELD

Aspects described herein generally relate to artificial intelligence for making recommendations for computer networks.

BACKGROUND

Today, many user's use a pay as you go licensing model to deploy a computer network. A licensing model may offer a variety of features that can be added to a user's network. A user may require a great deal of network expertise to determine features to add to the user's network. Alternatively, the user may need to hire a network engineer to recommend features to use in the network and modify the network to use the recommended features. It would be beneficial to have an intelligent system that is able to make recommendations for a user's network and modify the network according to the user's networking needs.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations described above, and to overcome other limitations that will be apparent upon reading and understanding the present specification, aspects described herein are directed towards using artificial intelligence to recommend network features to add to networks. A network configuration system may determine the network components and usage characteristics for each network within a plurality of networks. The network configuration system may use an ensemble to generate recommendations based on the network components and usage characteristics of the plurality of networks. The ensemble may include one or more machine learning based recommenders. The ensemble may also include a non-personalized recommender that generates recommendations based on known compatibility between network features. The network configuration system may weight recommendations from each recommender to create a ranked ordering of the recommendations. The network configuration system may modify (e.g., add or remove network features) one or more networks based on the recommendations and/or user input. As networks are modified, the network configuration system may train each recommender to provide better recommendations.

In one aspect, a computer implemented method may include determining one or more network components corresponding to a network within a plurality of networks; determining usage characteristics corresponding to the network within the plurality of networks; generating one or more feature vectors based on the network components and the usage characteristics; generating, by a recommender system and based on the feature vectors, a first set of one or more recommended network features for one or more of the plurality of networks and providing a recommended network feature from the generated first set of one or more recommended network features to a user device to enable the user device to modify the network.

The method may further include generating, based on a network feature dependency matrix, a second set of one or more recommended network features for the network within the one or more of the plurality of networks; and outputting a recommended network feature from the first set or second set of one or more recommended network features to the user device. The recommended network features within the first and second set of one or more recommended network features may include a value indicating a degree of benefit of adding the recommended network feature to the network.

The method may further include generating voting weights corresponding to the first and second set of one or more recommended network features; and determining, based on the ensemble voting weights, a ranking of each recommended network feature of the first and second set of one or more recommended network features, wherein the outputting a recommended network feature is based on the ranking.

The method may further include updating the ensemble voting weights in response to a change in an accuracy rating of the recommender system.

The method may further include after the outputting, determining, based on network data corresponding to the plurality of networks, one or more changes made to the plurality of networks; and retraining, based on the one or more changes, the recommender system. The method may further include training, based on the one or more feature vectors, a recommender system to recommend one or more network features to add to the plurality of networks. The one or more feature vectors may include real number representations of the one or more network components and the one or more usage characteristics.

In other aspects, a system may be configured to perform one or more aspects and/or methods described herein. In some aspects, an apparatus may be configured to perform one or more aspects and/or methods described herein. In some aspects, one or more computer readable media may store computer executed instructions that, when executed, configure a system to perform one or more aspects and/or methods described herein.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 5a-c depict an illustrative sequence diagram for recommending one or more features to one or more networks in accordance with one or more illustrative aspects described herein.

FIG. 6 depicts an illustrative feature dependency matrix that may be used in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards using artificial intelligence to recommend network features (e.g., a firewall, deep packet inspection, application steering, etc.) to add to networks. A network configuration system may determine the network components and usage characteristics for each network within a plurality of networks. The network configuration system may use an ensemble to generate recommendations based on the network components and usage characteristics of the plurality of networks. An ensemble may combine two or more models/techniques/algorithms to generate a recommendation. The ensemble may include one or more machine learning based recommenders. The ensemble may also include a non-personalized recommender that generates recommendations based on known compatibility between network features. The network configuration system may weight recommendations from each recommender to create a ranked ordering of the recommendations. The network configuration system may modify (e.g., add or remove network features) one or more networks based on the recommendations and/or user input. As networks are modified, the network configuration system may train each recommender to provide better recommendations. For example, a better recommendation may be a recommendation that a user is more likely to add to the network of the user.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
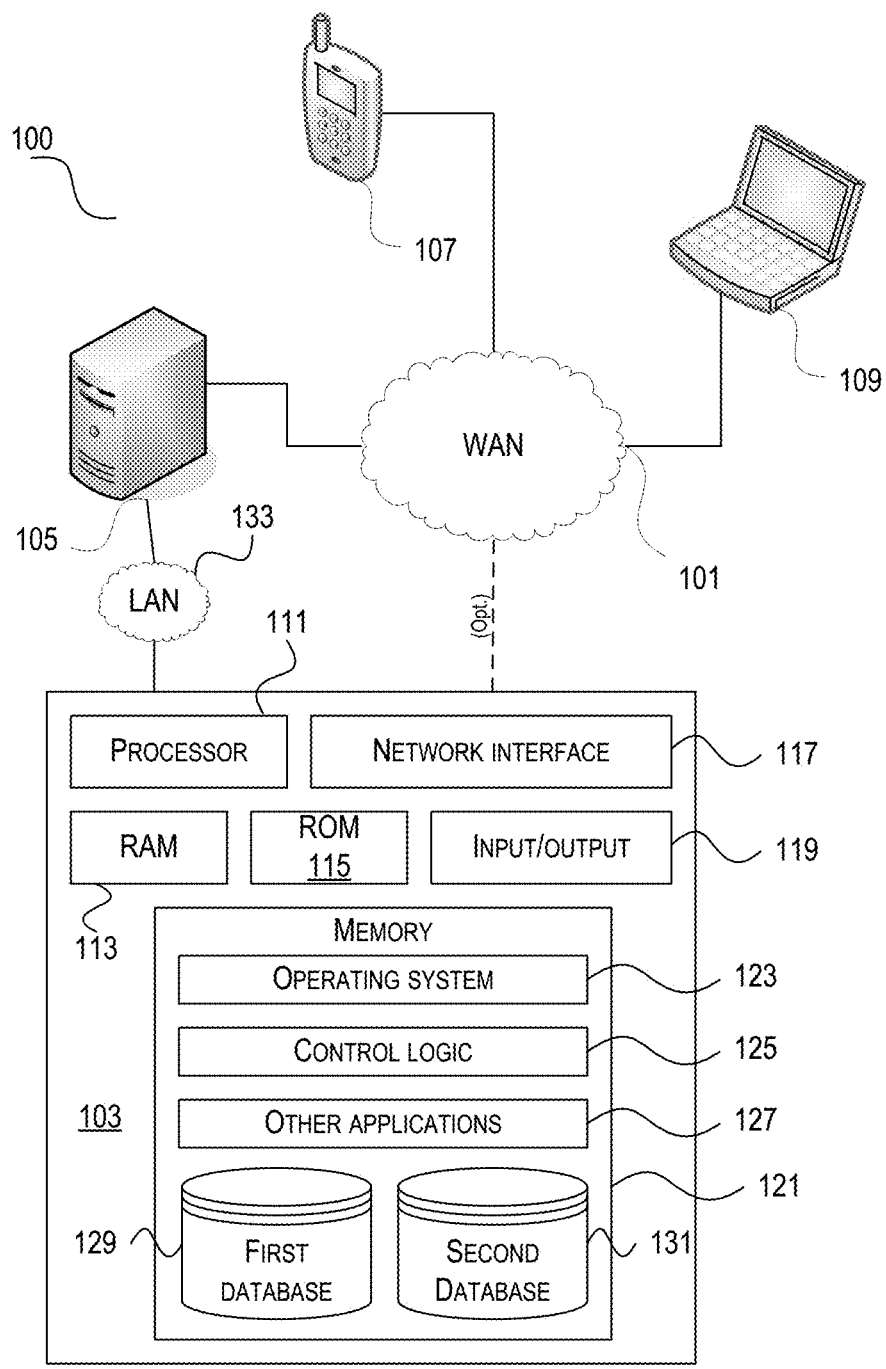
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
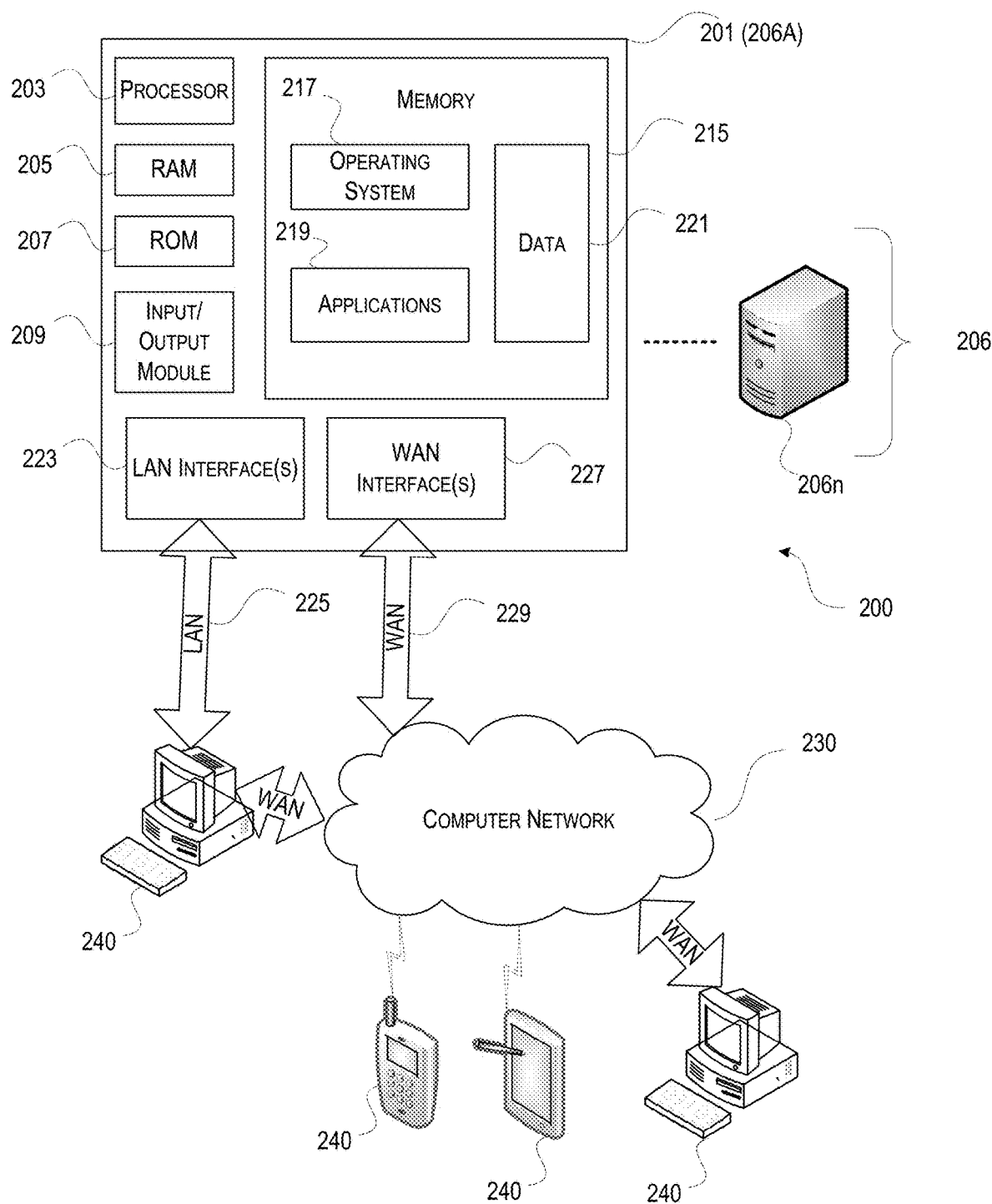
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Network Configuration

Figure 3:
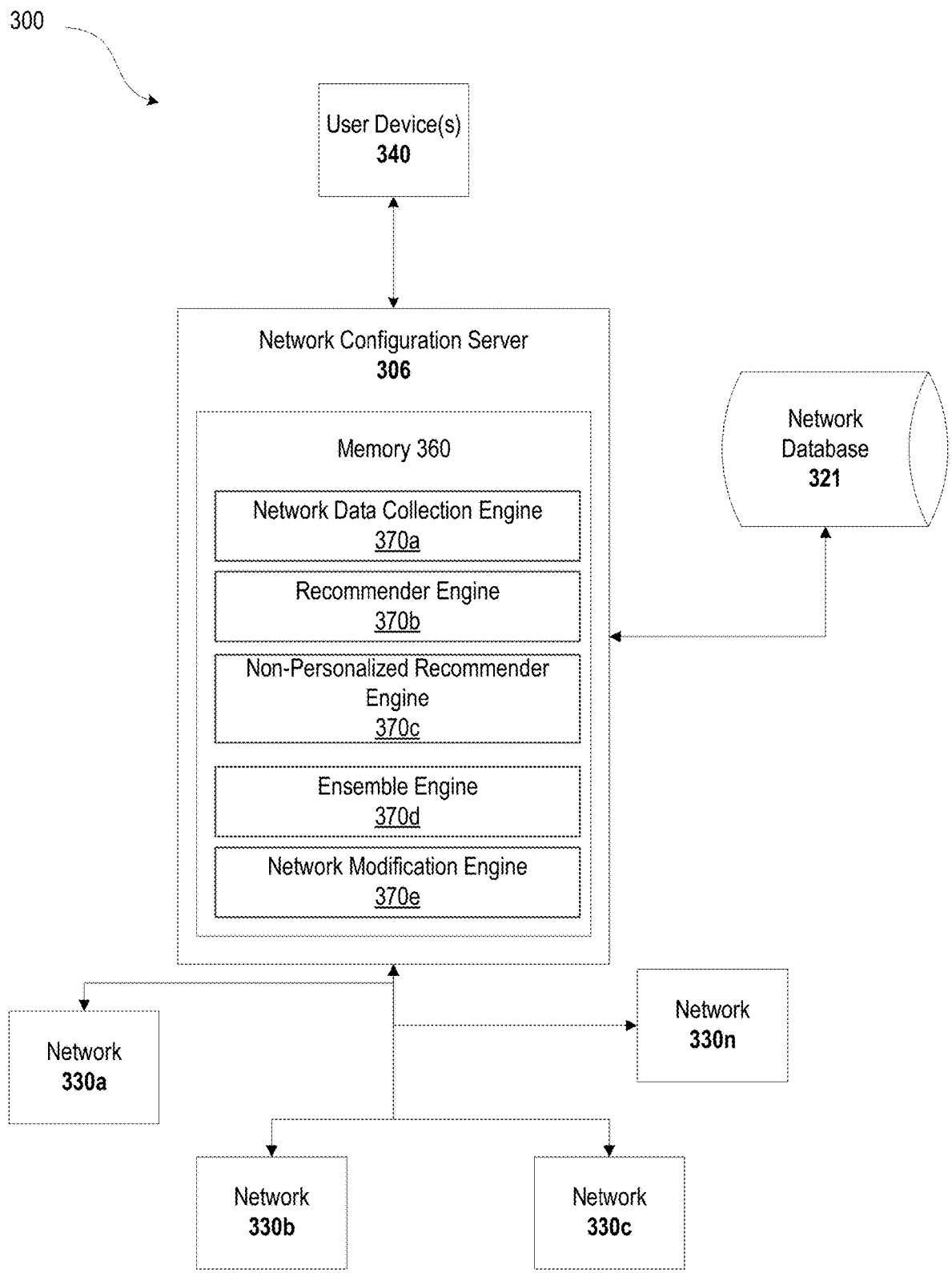
FIG. 3 depicts an illustrative network configuration system that may be used in accordance with one or more illustrative aspects described herein.

FIG. 3 depicts an illustrative network configuration system 300 that may be used in accordance with one or more illustrative aspects described herein. Network configuration system 300 may include one or more computer systems and one or more networks. For example, network configuration system may include a network configuration server 306, one or more networks 330a-330n, network database 321, and user device 340. In some examples, network configuration server 306 may be a device separate from user device(s) 340, while in other examples, network configuration server 306 may be part of a same device as user device 340. Any device within network configuration system 300 (e.g., network configuration server 306, networks 330a-330n, user device 340, network database 321, or the like) may include one or more components of network configuration server 306, computer system architecture 100 described in FIG. 1, or remote-access system architecture 200 described in FIG. 2.

As illustrated in greater detail below, network configuration server 306 may include one or more components configured to perform one or more of the functions described herein. For example, network configuration server 306 may include one or more components configured to collect or receive network characteristic data from a plurality of networks 330a-330n, train a recommender engine 370b, generate network feature recommendations, and modify networks by adding, removing, or modifying network features.

In addition, and as illustrated in greater detail below, the network configuration server 306 may be configured to generate, host, transmit, and/or otherwise provide information for one or more web pages and/or other graphical user interfaces (which may, e.g., cause one or more other computer systems to display and/or otherwise present the one or more web pages and/or other graphical user interfaces). The web pages and/or other graphical user interfaces may be displayed on user device 340. In some instances, the web pages, recommendations, information, and/or other graphical user interfaces generated by network configuration server 306 may be associated with an external portal, web page, or application provided by an organization. As discussed in more detail below and in step 450 of FIG. 4, the web pages, information, and/or other graphical user interfaces may allow the user to generate network feature recommendations, view details related to a network, and/or modify the features of a network. For example, a user may use user device 340 to view and use a web page to make a request for network feature recommendations. The user device 340 may receive network feature recommendations from network configuration server 306. A user may make a request, via user device 340, to add features to a network. The network configuration server 306 may cause the network to implement the requested features.

User device 340 may be a smartphone, personal digital assistant, laptop computer, tablet computer, desktop computer, smart home device, or the like configured to perform one or more functions described herein. For instance, user device 340 may be configured to communicate with network configuration server 306 to receive recommended network features for a network that is associated with user device 340. A recommended network feature may be any network product, functionality, and/or characteristic that may be added to a network's current set of products, functionalities, and/or characteristics. For example, recommended network features may include firewall, application steering, user behavior analytics, deep packet inspection and others. Although network configuration system 300 as shown includes a single user device 340, it should be understood that the network configuration system 300 may include any number of user devices similar to user device 340. Network configuration system 300 may include a number of user devices 340 that is equal to or greater than the number of networks 330a-330n. User device 340 may be part of one or more networks 330a-330n.

In addition, user device 340 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by user device 340 may be associated with an external portal, web page, or application provided by an organization. As discussed above and in more detail in step 450 of FIG. 4, the web pages, information, and/or other graphical user interfaces may allow a user to generate network recommendations, view network recommendations, add or remove network features to a network 330a-330n, and perform other actions related to a network configuration system.

Networks 330a-330n may be any type of computer network. Each network may comprise any component of any network described in FIGS. 1-2. For example, networks 330a-n may comprise one or more servers, user devices, firewalls, network hubs, network switches, modems, routers, network bridges, repeaters, or any other computer network device. Although only four networks 330a-n are shown, network configuration system 300 may contain or have access to data from any number of networks. Network database 321 may store network information (described in more detail below) received from networks 330a-330n.

Network configuration server 306 may be configured similar to device 103 and may include any component contained in device 103. In some instances, one or more program modules and/or databases may be stored by and/or maintained in different memory units of network configuration server 306 and/or by different components that may form and/or otherwise make up network configuration server 306. For example, memory 360 may have, store, and/or include a network data collection engine 370a, a recommender engine 370b, a non-personalized recommender engine 370c, an ensemble engine 370d, and a network modification engine 370e. In some aspects, user device 340 may include one or more components of the network configuration server 306, such that one or more processes or functions described herein with respect to network configuration server 306 may be performed by user device 340.

Network configuration server 306 may contain a network data collection engine 370a. The network data collection engine 370a may communicate with networks 330a-330n to obtain data about the networks 330a-330n. For example, the network data collection engine 370a may receive data generated by the networks 330a-330n. The data may include network characteristics (e.g., data indicating the structure of the network such as the number of devices within the network, locations of the devices, etc.) and usage characteristics (e.g., data indicating how the network is used such as applications used in the network, amount of bytes per application upload/download, etc.). The network configuration server 306 may store data collected or received by the network data collection engine 370a in network database 321.

The network configuration server 306 may contain a recommender engine 370b. The recommender engine 370b may be configured to use machine learning and/or statistical methods to recommend network features to one or more networks 330a-330n. As further described in steps 415-425 of FIG. 4, the recommender engine 370b may use one or more machine learning algorithms to generate feature recommendations for a network. Each algorithm may generate a different set of feature recommendations.

The network configuration server 306 may contain a non-personalized recommender engine 370c. The non-personalized recommender engine may use methods alternative to machine learning to generate feature recommendations for a network. For example, the non-personalized recommender engine 370c may use a dependency matrix to generate recommendations as discussed below with FIG. 4 and FIG. 6.

The network configuration server 306 may contain an ensemble engine 370d. The ensemble engine may be configured to combine different sets of recommendations into one ranked set of recommendations. The sets of recommendations may be generated by the recommender engine 370b and/or the non-personalized recommender engine 370c. As discussed in more detail in steps 427-443 of FIG. 4, the ensemble engine 370d may use machine learning, voting mechanisms, etc. to determine a final recommendation or set of recommendations to be output by the network configuration server 306.

The network configuration server 306 may contain a network modification engine 370e. The network modification engine 370e may receive input from user device 340. The input may be network features selected from a list. The input may indicate one or more network features to add, remove, or modify in one or more networks 330a-330n. The input may be based on recommendations generated by the non-personalized recommender engine 370c or the recommender engine 370b. The network modification engine 370e may modify one or more networks based on the input. For example, if a user has selected deep packet inspection to be added as a network feature, then the network modification engine 370e may cause a network associated with the user to use deep packet inspection on packets that travel through the network.

Figure 4:
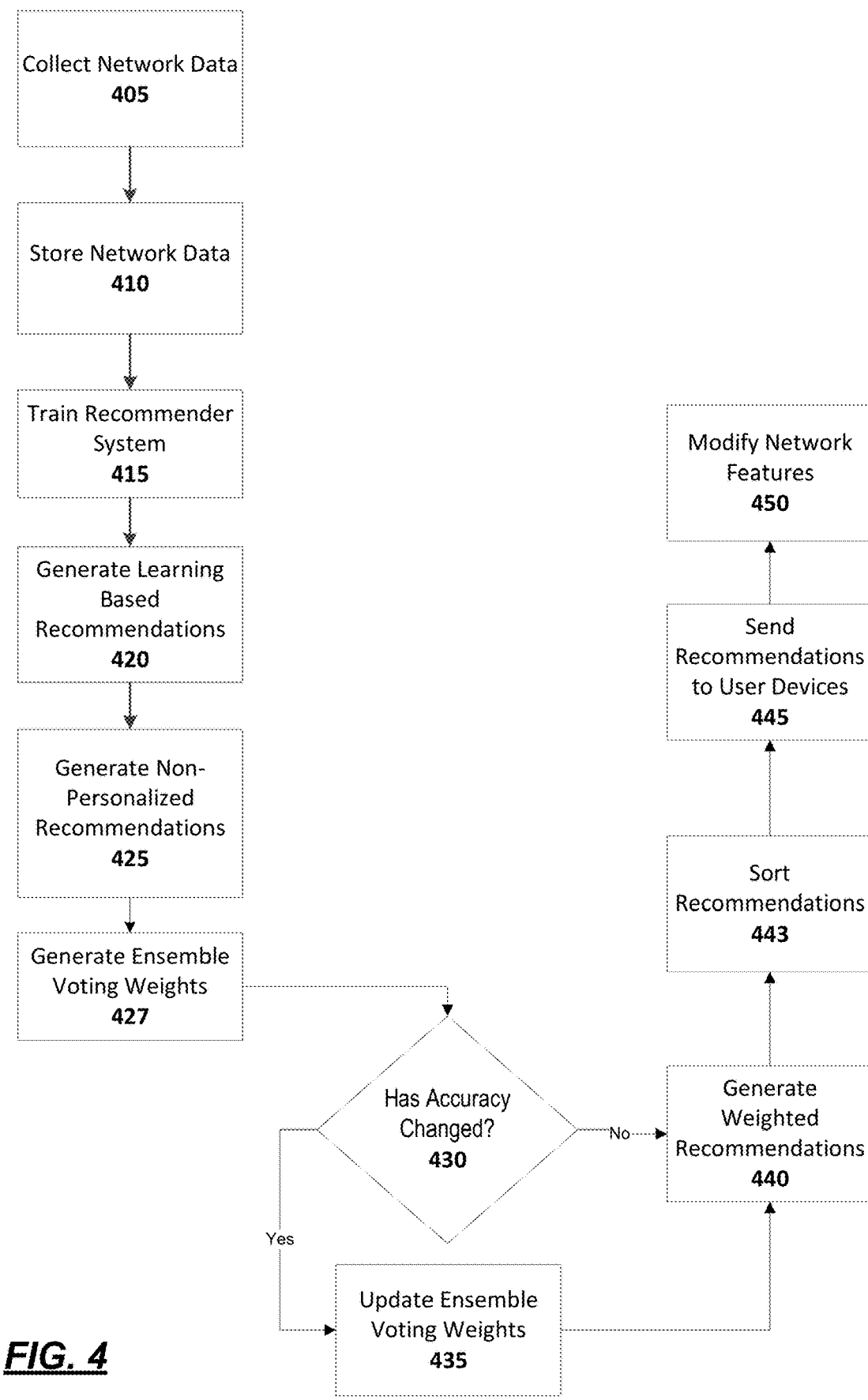
FIG. 4 depicts an illustrative method for recommending one or more features to one or more networks in accordance with one or more illustrative aspects described herein.

Referring to FIG. 4, a flow diagram is shown illustrating a method for recommending one or more features to one or more networks. The steps and various functionality described in reference to FIG. 4 may be performed by one or more components in network configuration system 300 such as user device 340, network configuration server 306, networks 330a-330n, or a combination of one or more devices, networks, and/or servers.

In step 405, the network configuration system (e.g., network configuration server 306 or user device 340) may collect network data. The network data may be generated by networks 330a-n. Network data may include the number of nodes in a network (e.g., computing devices), the number of links between nodes in a network, the upload/download speeds of the links, the geographic location of a branch (e.g., the location of a branch office), the number of links per branch, the type of link (e.g., broadband, multiprotocol label switching, satellite, telecommunication links such as Long-Term Evolution, etc.), throughput, Internet service provider(s) of the network, the features that the network currently subscribes to (e.g., firewall, deep packet inspection, application steering, etc.), and applications used by the nodes or devices in the network. Applications used on a network may be assigned to an application family (e.g., social networking applications, file sharing applications, etc.). Applications may be assigned to an application class (e.g., Realtime applications, interactive applications, bulk applications). Application families and/or application classes of applications used on a network may be included in network data collected by the network data collection engine 370a. Network data may include application usage data (e.g., information about how applications are used in the network). For example, network data may include an application's upload and download amount (e.g., measured in bytes). Application usage may include the network traffic of an application. Network data may also include application usage per geographic location. Network data may include quality of experience per application.

Network data may be collected continuously or periodically. The frequency at which network data is collected may be based on the type of data being collected. For example, while application family data may be collected only once (or anytime there is a change to an application family), upload/download speeds may be collected continuously. Network data from a branch office may be collected continuously within the branch office and may be transferred to network database 321 periodically (e.g., every week, month, quarter, year, etc.).

In step 410, the network configuration system 306 may store the network data. For example, the network configuration server 306 or the user device 340 may store the network data in network database 321.

In step 415, the network configuration system 306 may train a recommender algorithm. The recommender engine 370b may train the recommender algorithm to recommend network features for one or more networks 330a-330n. The training may use all or a portion of the network data. The training may use an algorithm designed for generating recommendations including content based algorithms and collaborative filtering based algorithms A content based algorithm may generate network feature recommendations for a network using data collected from the network and information that is known about network features. A collaborative filtering algorithm may generate network feature recommendations for a network using data collected from a group of networks. The recommender engine 370b may generate embeddings or vector representations for portions of the network data for use in training a recommender system. For example the recommender engine 370b may generate an embedding of each network 330a-330n. The recommender engine 370b may generate an embedding for each network 330a-330n using network data (as described above in step 405 of FIG. 4) from each network 330a-330n. The recommender engine 370b may also generate embeddings for the network features that may be recommended to a network. The dimensions of the embeddings may be any number (e.g., 1 by 300, 1 by 500, 1 by 2000, etc.). The embeddings may be used in a machine learning or recommender system algorithm.

The recommender engine 370b may use a sequential model to predict network features that one or more networks 330a-330n should add next. The recommender engine 370b may train a neural network to generate recommendations based on the sequential model. Data for the sequential model may be structured as sequences in time. For example, data instances may be created for each time a network is modified (e.g., a feature is added or removed). The data instance may contain network data corresponding to the status of the network just prior to the modification and the data instance may contain the feature that was added or removed to the network. A neural network may be trained to predict the feature that is added or removed based on the status of the network just prior to the modification.

The neural network may take any of the network data (described above) as input. Alternatively/additionally the neural network may take the network embeddings and/or feature embeddings as input. The neural network may have a number of hidden layers. The neural network may have an output layer. During training, the neural network may use a loss function (e.g., cross entropy, mean squared error, Kullback Leibler divergence, etc.) to update neural network weights and reduce error.

The recommender engine 370b may train using a matrix factorization algorithm. For example, the recommender engine 370b may generate a network-feature matrix with each network 330a-330n as a row and each subscribable feature as a column. Each value $m_{ij}$ in the network-feature matrix may represent a value added to a network at position i by a feature at position j. In one example, each value $m_{ij}$ in the network-feature matrix may be a 1 if the network represented by row i is subscribed to the feature represented by column j. If the network represented by row i is not subscribed to the feature represented by column j then the value $m_{ij}$ in the network-feature matrix may be blank. The recommender engine 370b may generate two additional matrices (e.g., a network matrix and a feature matrix) that when multiplied together, create an approximation of the network-feature matrix. For example, the recommender engine 370b may have a number of latent features k. The network matrix may have a row for each network 330a-330n and k columns, each column representing a latent feature. The feature matrix may have a row for each subscribable feature and k columns, each column representing a latent feature.

The recommender engine 370b may use gradient descent to determine the values of the network matrix and the feature matrix. For example, the recommender engine 370b may initialize the network matrix and the feature matrix with random values. The recommender engine 370b may then calculate an approximation matrix of the network-feature matrix by calculating the product of the network matrix and the feature matrix. The recommender engine 370b may calculate a difference between the approximation matrix and the network-feature matrix. The recommender engine 370b may adjust the values in the network matrix and/or the feature matrix to minimize the difference between the approximation matrix and the network-feature matrix. The process of calculating a difference between the approximation matrix and the network-feature matrix, and adjusting the values of the network matrix and/or the feature matrix may be repeated until convergence. The recommender engine 370b may use regularization to avoid overfitting when training with gradient descent.

After training the matrix factorization algorithm is completed, the recommender engine 370b may recommend features to networks using the final approximation matrix. For example, the recommender engine 370b may recommend features for a network if they were blank in the network-feature matrix but have a high value in the approximation matrix. The recommender engine 370b may sort each feature by its corresponding value in the approximation matrix and may suggest a number (e.g., 1, 3, 5, etc.) of the highest valued features. The value in the approximation matrix may be the benefit value for the recommendation as discussed below in step 420.

At step 420, the network configuration system may generate learning based recommendations. The recommender engine 370b may use an algorithm trained in step 415 to generate feature recommendations for one or more networks 330a-330n. Each feature recommendation that is generated may have a corresponding benefit value that indicates a degree of benefit that would be provided to the network if the feature were added to the network.

At step 425, the network configuration system 300 may generate non-personalized recommendations for one or more networks 330a-330n. When generating non-personalized recommendations, the non-personalized recommender engine 370c may ignore network characteristics (e.g., data indicating the structure of a network) and usage characteristics (e.g., data indicating how a network is used). The non-personalized recommender engine 370c may use feature data stored in the network database 321 to generate non-personalized recommendations. The feature data may indicate to what degree a network containing a first feature will benefit from adding a second feature. For example, the network database 321 may contain data corresponding to a feature dependency matrix. As illustrated in FIG. 6, the feature dependency matrix 600 may have a number of features (e.g., features 605, 610, and 615) contained in the rows and columns of the matrix. Although only five features are illustrated in FIG. 6, the dependency matrix may have any number of features. Each value (e.g., value 620, 625) in the matrix may indicate an inter-dependence between a feature pair (i.e., the feature in the corresponding row and the feature in the corresponding column of the value). For example, value 620 is a 1 and may indicate that deep packet inspection would be a great feature to add to a network that contains the user behavior analytics feature. As an additional example, value 625 is a 0 and may indicate that application steering is not a great feature to recommend to a network that contains a firewall feature.

The non-personalized recommender engine 370c may use the dependency matrix 600 to generate recommendations for a network. For example, the non-personalized recommender engine 370c may use the dependency matrix to compare features that are not contained in a network with features that are contained in a network. The non-personalized recommender engine 370c may generate feature pairs where each pair contains a feature that is not in the network and a feature that is in the network. The non-personalized recommender engine 370c may then determine the dependency matrix value for each feature pair. The non-personalized recommender engine 370c may determine a number (e.g., 1, 5, 10) of feature pairs that have the highest values in the dependency matrix. The non-personalized recommender engine may then recommend the features in each feature pair that are not part of the network.

Learning based recommendations and/or the non-personalized recommendations may also contain explanations for why a feature is recommended. For example, if deep packet inspection is recommended as a feature to add to a network that contains a firewall feature, the network configuration server 306 may generate an explanation such as the following: deep packet inspection, which is used for app classification and per-app reporting, adds a great deal of value to networks containing firewall features because when apps are identified at better granularity using deep packet inspection, firewall can facilitate better control. The explanations for each recommendation may be displayed to a user via user device 340.

At step 427, the network configuration system 300 may generate ensemble voting weights. The ensemble voting weights may be used to determine which learning based recommendations and which non-personalized recommendations should be output to users. The ensemble voting weights may be generated by the ensemble engine 370d. The ensemble engine 370d may generate a learning weight for the learning based recommendations and a non-personalized weight for the non-personalized recommendations. The ensemble voting weights may weigh the non-personalized recommendations higher than the learning based recommendations. For example, the weight for the non-personalized recommendations may be 1, 0.9, 0.8, etc., while the weight for the learning based recommendations may be 0.1, 0.2, etc.

At step 430, the network configuration system may determine whether an accuracy rating of the learning based recommendations has changed. The recommender engine 370b may continually train and/or improve a recommender system using network data contained in network database 321. If the accuracy rating of the learning based recommendations does not change, then the network configuration system 300 may proceed to step 440. If the accuracy rating of the learning based recommendations changes, then the network configuration system 300 may update the ensemble voting weights at step 435. The ensemble engine 370d may update the ensemble voting weights to give more or less weight to the learning based recommendations. For example, the ensemble engine 370d may increase the weight for the learning based recommendations (e.g., from 0.1 to 0.2) if the accuracy rating improved. If the accuracy rating decreases, the ensemble engine 370d may decrease the weight for the learning based recommendations. Additionally/alternatively the ensemble engine 370d may increase or decrease the weight for the non-personalized recommendations. For example, the ensemble engine 370d may decrease the weight for the non-personalized recommendations (e.g., from 0.9 to 0.7). The amount of increase/decrease may depend on the amount that the learning based recommendations improve or decrease in accuracy.

At step 440, the network configuration system 300 may generate weighted recommendations. The ensemble engine 370*d* may generate weighted recommendations using the ensemble voting weights and values corresponding to each recommendation within the non-personalized set of recommendations and the learning based set of recommendations. For example, the ensemble engine 370*d* may multiply the values of each non-personalized recommendation by the non-personalized weight that is generated in step 427. The ensemble engine 370*d* may also multiply the benefit value of each learning based recommendation by the learning weight that is generated in step 427. By multiplying the benefit value of each recommendation by its corresponding weight, each recommendation will have a weighted benefit value.

At step 443, the network configuration system 300 may sort recommendations. The ensemble engine 370*d* may sort each recommendation according to the weighted benefit values of each recommendation. For example, the non-personalized recommendations and the learning based recommendations may be combined and/or sorted according to their weighted benefited values. The recommendations may be sorted from highest weighted value to lowest weighted value or vice versa.

At step 445, the network configuration system 300 may send recommendations to user devices such as user device 340. The network configuration server 306 may send a number of weighted recommendations (e.g., 1, 5, 10, etc.) with the highest or lowest weighted benefit values to user device 340.

At step 450, the network configuration system 300 may modify network features of one or more networks 330*a*-330*n*. For example, after receiving one or more network feature recommendations as described in step 445, user device may send a request to network configuration server 306 or to a network 330*a*-330*n* to have a feature added to or removed from the network. The modification may be performed by the network modification engine 370*d*. The network modification engine 370*d* may modify a network by installing/uninstalling software on one or more devices in a network. The network modification engine 370*d* may add a feature to a network by configuring additional devices to perform actions within a network. For example, the network modification engine 370*d* may receive input from user device 340 indicating that deep packet inspection should be added to a network. The network modification engine 370*d* may send instructions to one or more devices within the network causing the one or more devices to perform deep packet inspection. The network configuration system may repeat steps 405-450 and may continue making network feature recommendations and modifying networks 330*a*-330*n*.

Figure 5A:
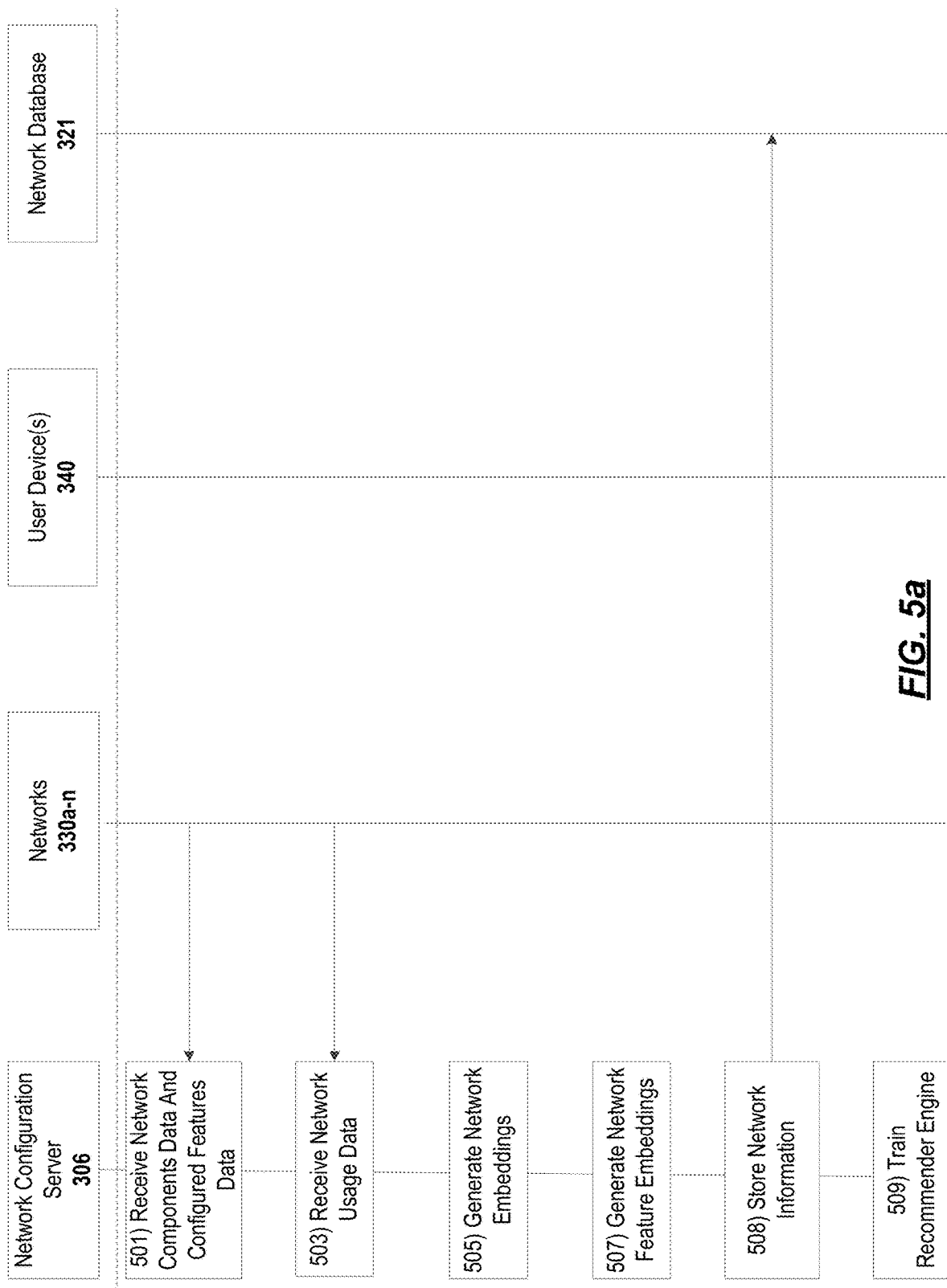
Figure 5C:
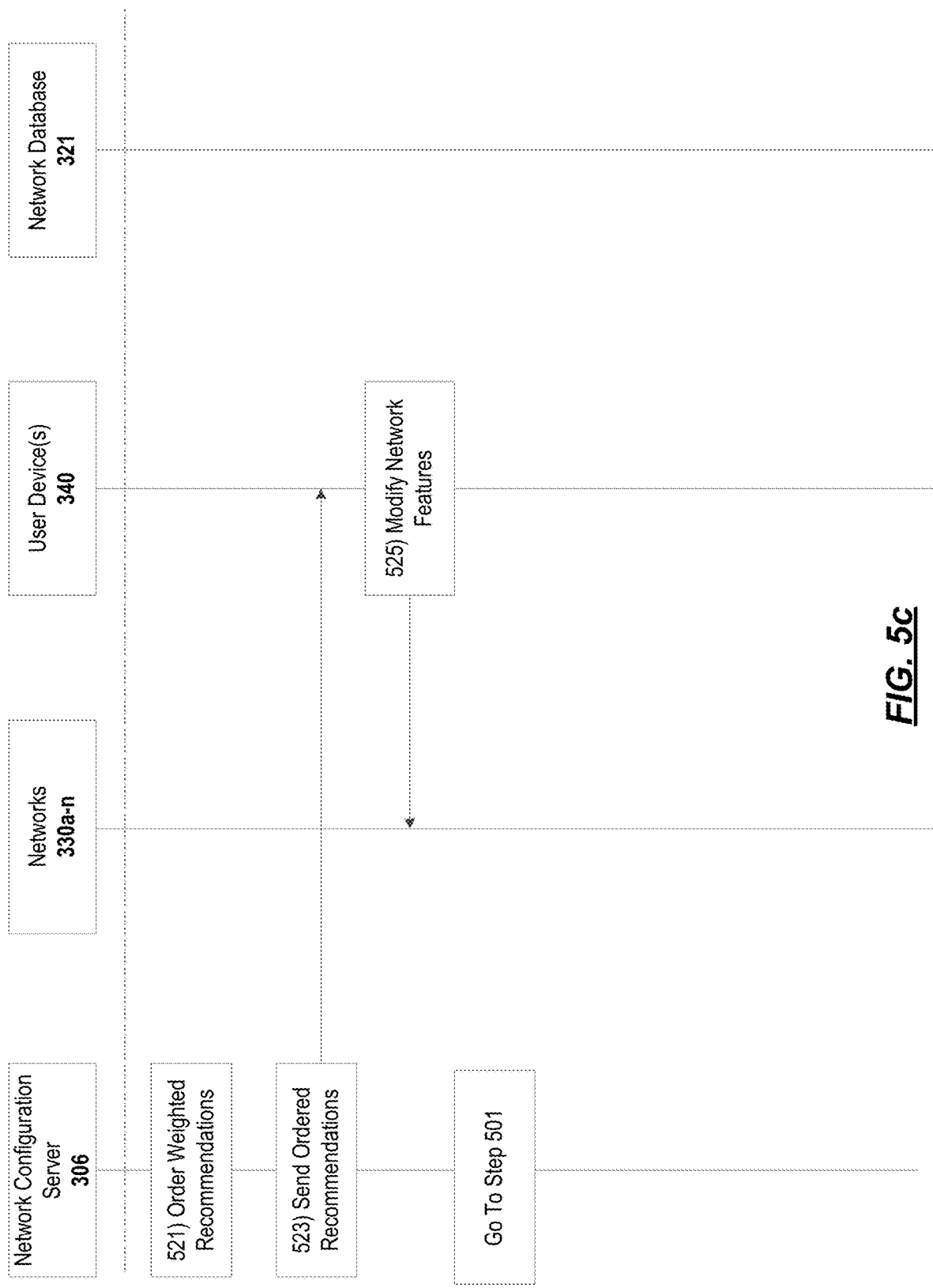

FIGS. 5*a*-5*c* depict an illustrative sequence diagram for recommending one or more features to one or more networks. Referring to FIG. 5*a*, at step 501 the network configuration server 306 may receive network components data and configured features data from networks 330*a*-330*n*. At step 503 the network configuration server 306 may receive network usage data from the networks 330*a*-330*n*.

At step 505, the network configuration server 306 may generate network embeddings. The network configuration server 306 may generate a network embedding for each of networks 330*a*-330*n*. Each embedding may be a vector representation of the corresponding network including its components (e.g., devices, links, other structural components) and how the network is used (e.g., applications run on the network, throughput, etc.). A neural network may be used to generate network embeddings. Each network embedding may be initialized with random values. The neural network may use gradient descent to modify each network embedding so that networks with similar network data will have similar network embeddings.

At step 507, the network configuration server 306 may generate network feature embeddings. The network feature embeddings may be vector representations of add-on features that are available for subscription. For example, when setting up a network a user may be able to add features to the network such as firewall, deep packet inspection, user behavior analytics, etc. Each of these features may have its own vector representation that is generated by the network configuration server 306. Network data may be used to generate network feature embeddings. For example, each network may have a list containing each network feature in the order that it was added to the network. Using negative sampling, a neural network may be trained to generate embeddings for each network feature. Each embedding may be initialized with random numbers. Each embedding may then be updated with gradient descent by using a sliding window over the lists of network features. The feature at the center of the sliding window may be updated using the context of a number (e.g., 3, 5, 10, etc.) of network features to the left and to the right of the center feature on the list. The network embeddings and the network feature embeddings may comprise real numbers (e.g., any rational or irrational number).

At step 508, the network configuration server 306 may store network information in network database 321. The network information may include the network components data, configured features data, network usage data, and any generated embeddings.

At step 509, the network configuration server 306 may train the recommender engine 370*b*. The network configuration server 306 may use data stored in network database 321 to train the recommender engine 370*b*. Referring to FIG. 5*b*, at step 511, the network configuration server may generate learning based recommendations for one or more networks 330*a*-330*n* (as described in steps 415-420 of FIG. 4). At step 513, the network configuration server 306 may generate non-personalized recommendations (as described in step 425 of FIG. 4). At step 515, the network configuration server 306 may determine an accuracy of the recommender engine 370*b* (as described in step 430 of FIG. 4).

At step 517, the network configuration server 306 may generate ensemble voting weights. The ensemble voting weights may be used to combine the learning based recommendations and the non-personalized recommendations into a combined set of weighted recommendations. At step 519, the network configuration server 306 may generate weighted recommendations (as described in step 440 of FIG. 4). The weighted recommendations may be weighted based on the accuracy rating of the recommender engine or learning based recommendations.

Referring to FIG. 5*c*, at step 521, the network configuration server 306 may order the weighted recommendations. The weighted set of recommendations may be ordered according to an estimated amount of benefit that each recommendation will provide to a network if it were added to the network. At step 523, the network configuration server 306 may send the ordered recommendations to user device 340.

At step 525, user device 340 may modify network features. User device 340 may modify network features of one or more networks 330*a*-330*n* that are associated with the user device 340. Modifying network features may include adding a feature or removing a feature from the network. The user device 340 may add or remove features according to the ordered recommendations. The network configuration system 300 may proceed to step 501 to repeat steps 501-525 and make additional recommendations (as described in more detail in steps 405-440 of FIG. 4).

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
receiving, by a computing device, data about one or more devices of a network;
generating, by the computing device, a plurality of vectors based on the received data and characteristics of the network, at least one vector being indicative of a first feature that has been added to the network;
determining, by the computing device, a set of features to recommend for the network based on the generated plurality of vectors, the determination including use of a matrix, wherein the matrix indicates an interdependence between the first feature of the network and a second feature, that has not been added to the network, of the set of features, wherein the interdependence indicates a degree of benefit of adding the second feature to the network; and
generating the set of features to recommend for the network;
determining based on voting weights of the set of features, a ranking of each feature of the set of features;
outputting, based on the ranking and to a user device, the second feature; and
modifying, by the computing device, a configuration of the network to add the second feature of the set of features to the network.

2. The method of claim 1, wherein the received data indicates one or more subscription features of the network.

3. The method of claim 1, further comprising:
determining, based on network data corresponding to a plurality of networks associated with the network, one or more changes made to the plurality of networks; and
training, based on the one or more changes, a recommender system configured to generate the set of features.

4. The method of claim 1, further comprising:
training, based on the plurality of vectors, a recommender system to recommend one or more network features to add to the network, wherein the plurality of vectors comprise real number representations of the received data and the characteristics.

5. A system comprising:
a server and a user device,
wherein the server comprises:
one or more processors and memory, configured to:
receive data about one or more devices of a network;
generate a plurality of vectors based on the received data and characteristics of the network, at least one vector being indicative of a first feature that has been added to the network;
determine a set of features to recommend for the network based on the generated plurality of vectors, the determination including use of a matrix, wherein the matrix indicates an interdependence between the first feature of the network and a second feature, that has not been added to the network, of the set of features, wherein the interdependence indicates a degree of benefit of adding the second feature to the network;
generate the set of features to recommend for the network;
determine, based on voting weights of the set of features, a ranking of each feature of the set of features;
output, based on the ranking and to the user device, the second feature; and
modify a configuration of the network to add the second feature of the set of features to the network.

6. The system of claim 5, wherein the generating the set of features is further based on an amount of data uploaded by a node in the network.

7. The system of claim 5, wherein the received data further indicates a plurality of applications used by a first device of a plurality of devices within the network.

8. The system of claim 5, wherein the one or more processors and memory are further configured to:
after the modifying, determine, based on network data corresponding to a plurality of networks, one or more changes made to the plurality of networks; and
train, based on the one or more changes, a recommender system configured to generate the set of features to recommend for the network.

9. The system of claim 5, wherein the one or more processors and memory are further configured to:
train, based on the plurality of vectors, a recommender system to recommend one or more network features to add to the network, wherein the plurality of vectors comprise real number representations of the received data and the characteristics.

10. A non-transitory machine-readable medium storing instructions, that when executed by one or more processors, cause the one or more processors to:
receive data about one or more devices of a network;
generate a plurality of vectors based on the received data and characteristics of the network, at least one vector being indicative of a first feature that has been added to the network;
determine a set of features to recommend for the network based on the generated plurality of vectors, the determination including use of a matrix, wherein the matrix indicates an interdependence between the first feature of the network and a second feature, that has not been added to the network, of the set of features, wherein the interdependence indicates a degree of benefit of adding the second feature to the network;
generate the set of features to recommend for the network;
determining, based on voting weights of the set of features, a ranking of each feature of the set of features;
outputting, based on the ranking and to a user device, the second feature; and
modify a configuration of the network to add the second feature of the set of features to or from the network.

11. The non-transitory machine-readable medium of claim 10, wherein the generating a set of features is further based on an amount of data uploaded by a node in the network.

12. The non-transitory machine-readable medium of claim 10, wherein the received data indicates a number of nodes within the network.

13. The non-transitory machine-readable medium of claim 12, wherein the instructions, when executed by the one or more processors, further cause the one or more processors to:
  after the modifying, determine, based on network data corresponding to a plurality of networks associated with the network, one or more changes made to the plurality of networks; and
  train, based on the one or more changes, a recommender system configured to generate the recommendations.

* * * * *